(12) United States Patent
Nair et al.

(10) Patent No.: US 8,494,525 B2
(45) Date of Patent: Jul. 23, 2013

(54) METHODS FOR MANAGING CO-LOCATED MACRO AND FEMTO BASE STATION DEPLOYMENTS AND METHODS FOR INITIATING MOBILE STATION HANDOFF

(75) Inventors: Suresh Nair, Whippany, NJ (US); Peretz Feder, Englewood, NJ (US)

(73) Assignee: Alcatel Lucent, Paris (FR)

( * ) Notice: Subject to any disclaimer, the term of this patent is extended or adjusted under 35 U.S.C. 154(b) by 383 days.

(21) Appl. No.: 12/662,117

(22) Filed: Mar. 31, 2010

(65) Prior Publication Data
US 2011/0047029 A1 Feb. 24, 2011

Related U.S. Application Data

(60) Provisional application No. 61/274,983, filed on Aug. 24, 2009.

(51) Int. Cl.
*H04W 36/00* (2009.01)

(52) U.S. Cl.
USPC ..... 455/436; 455/442; 455/432.1; 455/435.1; 370/331

(58) Field of Classification Search
USPC ............. 455/436, 442, 432.1, 435.1; 370/331
See application file for complete search history.

(56) References Cited

U.S. PATENT DOCUMENTS

| 8,175,005 | B2 * | 5/2012 | Okmyanskiy et al. | 370/254 |
|---|---|---|---|---|
| 2006/0092883 | A1 | 5/2006 | Lee et al. | |
| 2008/0151843 | A1 * | 6/2008 | Valmikam et al. | 370/338 |
| 2009/0310568 | A1 | 12/2009 | Chen et al. | |
| 2010/0003986 | A1 | 1/2010 | Chen | |
| 2010/0113031 | A1 | 5/2010 | Kim et al. | |

FOREIGN PATENT DOCUMENTS

| EP | 1 786 231 | 5/2007 |
|---|---|---|
| GB | 2 447 569 | 9/2008 |
| WO | WO 2010/048583 | 4/2010 |

OTHER PUBLICATIONS

International Search Report and Written Opinion dated Nov. 25, 2010.
"Part 16: Air Interface for Broadband Wireless System" by LAN/MAN Standards Committee of the IEEE Computer Society and the IEEE Microwave Theory and Techniques Society, Jan. 2009, whole document.
International Preliminary Report on Patentability dated Mar. 8, 2012 issued in International Application No. PCT/US2010/046070.

* cited by examiner

*Primary Examiner* — Nghi H Ly
(74) *Attorney, Agent, or Firm* — Harness, Dickey & Pierce PLC

(57) ABSTRACT

In a method for managing a plurality of neighboring base stations and handoff of a mobile station, a radio frequency equipment organizes the plurality of neighboring base stations into groups according to base station grouping characteristics associated with the plurality of neighboring base stations. The radio frequency equipment then manages the organized plurality of neighboring base stations for handoff of the mobile station.

25 Claims, 4 Drawing Sheets

METHODS FOR MANAGING CO-LOCATED MACRO AND FEMTO BASE STATION DEPLOYMENTS AND METHODS FOR INITIATING MOBILE STATION HANDOFF

CROSS-REFERENCE TO RELATED APPLICATION(S)

This non-provisional U.S. patent application claims priority under 35 U.S.C. §119(e) to provisional patent application No. 61/274,983 filed on Aug. 24, 2009, the entire contents of which is incorporated herein by reference.

BACKGROUND OF THE INVENTION

A femto base station is basically a low cost and low power base station (BS) transceiver, which is installed indoors (e.g., in a home or office). A femto base station is usually connected to the Internet via cable, a digital subscriber line (DSL), an on-premise fiber optic link, or a similar Internet Protocol (IP) backhaul technology. This connection is used to integrate the femto base station with a wireless operator's core network.

A femto base station serves a geographic area known as a femto cell over a single carrier or channel. A femto cell typically covers a smaller geographic area or subscriber constituency than a conventional macro cell. For example, a femto base station typically provides radio coverage in a geographical area such as a building or home, whereas a conventional macro base station provides radio coverage in a larger area such as an entire city or town. Femto cells may exist within or overlap macro cells.

The function of a femto cell is similar to that of a Wireless Local Area Network (LAN), and provides operators a relatively low cost solution for extending coverage areas and off-loading users from the cellular network.

In conventional wireless femto base station deployments in multiple technologies such as WiMAX, long term evolution (LTE), enhanced-voice-data-only (EVDO), etc., a relatively large number (e.g., 100 s) of femto base stations co-exist with macro base stations. But, conventional handoff methods based on neighbor base station scanning typically performed by mobile stations are designed for a limited set of neighbor macro base stations. Thus, these conventional methods are not adequate for scenarios having to deal with larger numbers of femto base stations in addition to the conventional macro base stations at least because: (1) conventional scanning of all the potential target base stations drain the device battery; (2) limited space in the air interface within the broadcast messages restricts inclusion of all the potential base station details; and (3) relatively long scanning periods of all the potential target base stations affect data transmission/reception.

Moreover, the presence of larger numbers of neighbor base stations (e.g., macro and/or femto) also impedes efficient management of these neighbors for potential handoff because reporting too many base stations to the mobile station in an advertisement field is impractical.

SUMMARY OF THE INVENTION

Example embodiments relate to methods for managing femto and macro base station co-deployments. Example embodiments also relate to methods for initiating handoff of a mobile station in a wireless network including femto and macro base station co-deployments.

At least one example embodiment provides a method for managing a plurality of neighboring base stations and handoff of a mobile station. According to at least this example embodiment, a radio frequency equipment organizes the plurality of neighboring base stations into groups according to base station grouping characteristics associated with the plurality of neighboring base stations. The radio frequency equipment then manages the organized plurality of neighboring base stations for handoff of the mobile station.

At least one other example embodiment provides a method for managing a plurality of neighboring base stations and initiating handoff of a mobile station. According to at least this example embodiment, a radio frequency equipment organizes the plurality of neighboring base stations into groups according to base station grouping characteristics associated with each of plurality of neighboring base stations, and advertises each of the groups in an advertisement message. The radio frequency equipment at least one of manages and initiates handoff of the mobile station to a base station in an advertised group. The advertisement message includes a base station group identifier identifying each of the groups, and each base station group identifier is at least one of indicative and representative of the base station, grouping characteristics associated with a corresponding group.

At least one other example embodiment provides a method for managing a plurality of neighboring base stations and initiating handoff of a mobile station to one of the plurality of neighboring base stations. According to at least this example embodiment, a radio frequency equipment organizes the plurality of neighboring base stations into groups according to base station grouping characteristics associated with the plurality of neighboring base stations, and advertises each of the groups in la distinctive identifiable fashion in an advertisement message. The radio frequency equipment then at least one of manages and initiates handoff of the mobile station to an advertised group. The advertisement message includes a base station group identifier identifying each of the groups, and the base station group identifier is indicative of base station grouping characteristics associated with the groups. The base station group identifier associated with each of the groups is a base station identifier for a representative base station within each group.

According to at least some example embodiments, the radio frequency equipment may be the serving base station to which the mobile station is currently attached.

Example embodiments described herein provide for more efficient management of larger numbers of neighbor base stations (e.g., macro and/or femto) for potential handoff.

Example embodiments described herein also improve device battery life, reduce consumption of limited space in the air interface for broadcast messages, and/or reduce relatively long scanning periods of all the potential target base stations affecting data transmission/reception.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Figure 1:
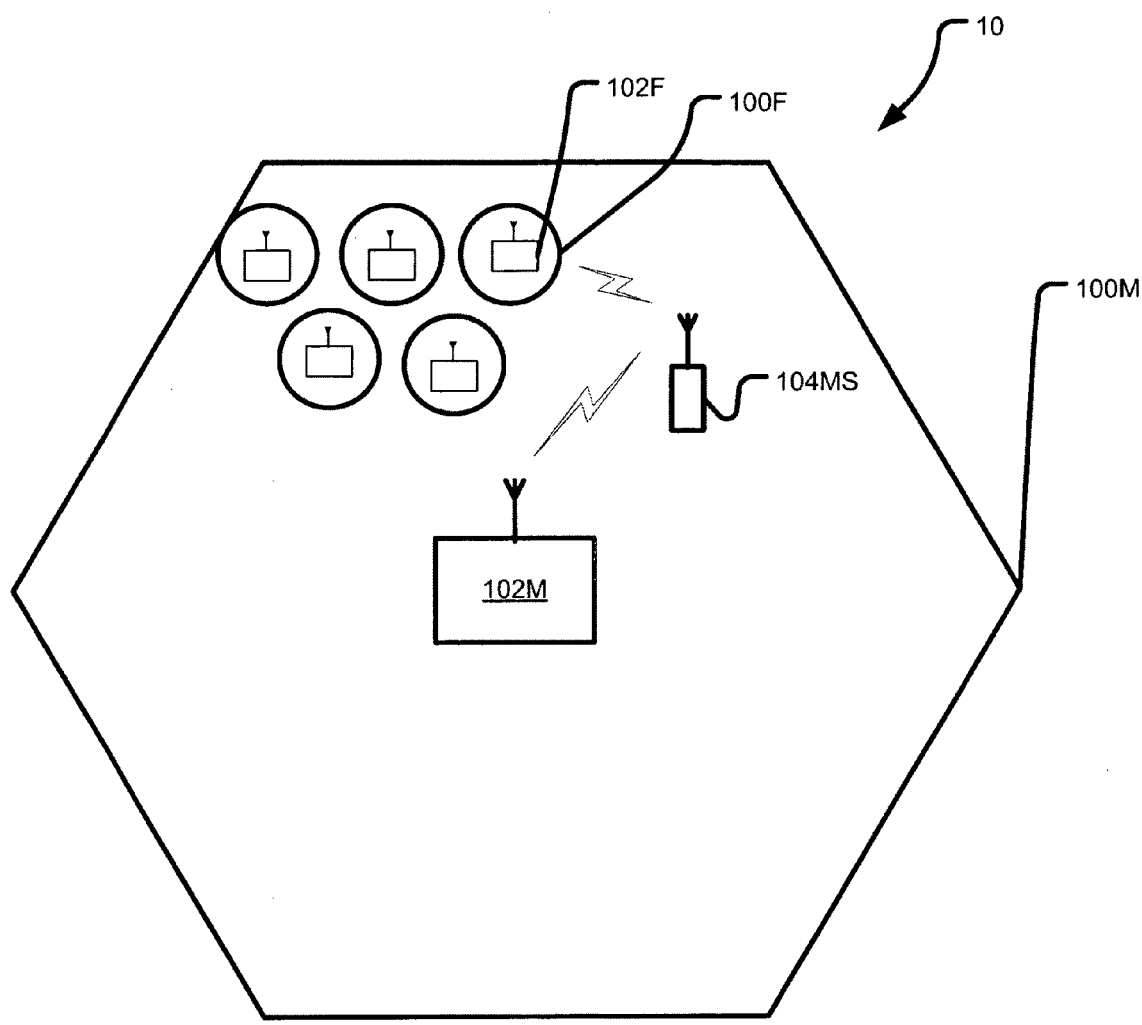
FIG. 1 illustrates a portion of a telecommunications network in which example embodiments may be implemented.

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms such as "beneath," "below," "lower," "above," "upper" and the like, may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation which is above as well as below. The device may be otherwise oriented (rotated 90 degrees or viewed or referenced at other orientations) and the spatially relative descriptors used herein should be interpreted accordingly.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, for example, those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It is convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, that perform particular tasks or implement particular abstract data types and may be implemented using existing hardware at existing network elements or control nodes (e.g., a database). Such existing hardware may include one or more Central Processing Units (CPUs), digital signal processors (DSPs), application-specific-integrated-circuits, field programmable gate arrays (FPGAs) computers or the like.

It should be borne in mind; however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of computer readable medium or implemented over some type of transmission medium. The computer readable medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. Example embodiments are not limited by these aspects of any given implementation.

Example embodiments are described herein in the context of Worldwide Interoperability for Microwave Access (WiMAX) femto deployments, but are intended to be broadly applicable to femto/macro co-location deployments generally.

FIG. 1 illustrates a portion of a telecommunications system in which illustrative embodiments may be implemented. The telecommunications system 10 is shown as a portion of a radio access network (RAN) including a macro cell 100M and a plurality of femto cells 100F, each of which have different coverage areas. As shown, the plurality of femto cells 100F overlap with the coverage area of the macro cell 100M. In FIG. 1, the femto cells 100F are considered neighbors of the macro cell 100M.

The RAN shown in FIG. 1 may include a RAN control node (not shown). The RAN control node may be, for example, a radio network controller (RNC) in a hierarchical network architecture or a serving radio network controller (SRNC) in a flat network. The RAN control node may be linked with a macro base station 102M via one or more packet and/or circuit switched networks (e.g., one or more Internet Protocol (IP) networks or the like). The macro base station 102M provides radio coverage in the macro cell 100M.

The RAN may also include a femto management system (FMS) (not shown). The FMS is analogous to and has the same functionality as a RAN control node in a Macro cellular system.

The FMS may maintain a separate link with each of a plurality of femto base stations 102F via one or more packet and/or circuit switched networks (e.g., one or more Internet Protocol (IP) networks or the like). The femto base stations 102F provide radio coverage in respective femto cells 100F. Although not specifically discussed herein, example embodiments may be implemented in connection with or applicable to pico base stations or micro base stations.

As discussed herein, the femto base stations, macro base stations and/or network controllers may be referred to as radio frequency network equipment/elements or RAN control nodes.

Other types of telecommunications systems which encompass other types of radio access networks include the following: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; Worldwide Interoperability for Microwave Access (WiMAX); ultra mobile broadband (UMB); and long term evolution (LTE).

Referring still to FIG. 1, as is well-known, mobile station 104MS communicates with one or more of femto base stations 102F and macro base station 102M over an air interface. The mobile station 104MS may be, for example, a mobile telephone ("cellular" telephone), a portable computer, pocket computer, hand-held computer, a personal digital assistant (PDA), a car-mounted mobile device or the like, which communicates voice and/or data with the RAN.

For the sake of example, FIG. 1 shows only a few femto base stations 102F, a few femto cells 100F, a single macro base station 102M, a single macro cell 100M and a single mobile station 104MS. However, it will be understood that RANs may include any number of base stations and cells (femto and macro), which serve any number of mobile stations.

Example embodiments provide methods for managing femto base station and macro base station co-deployments, and/or overlay deployments. In one embodiment, handoff of a mobile station from a macro base station to a femto base station is controlled by managing a number of candidate femto base stations to which the mobile station may be handed off.

Figure 2:
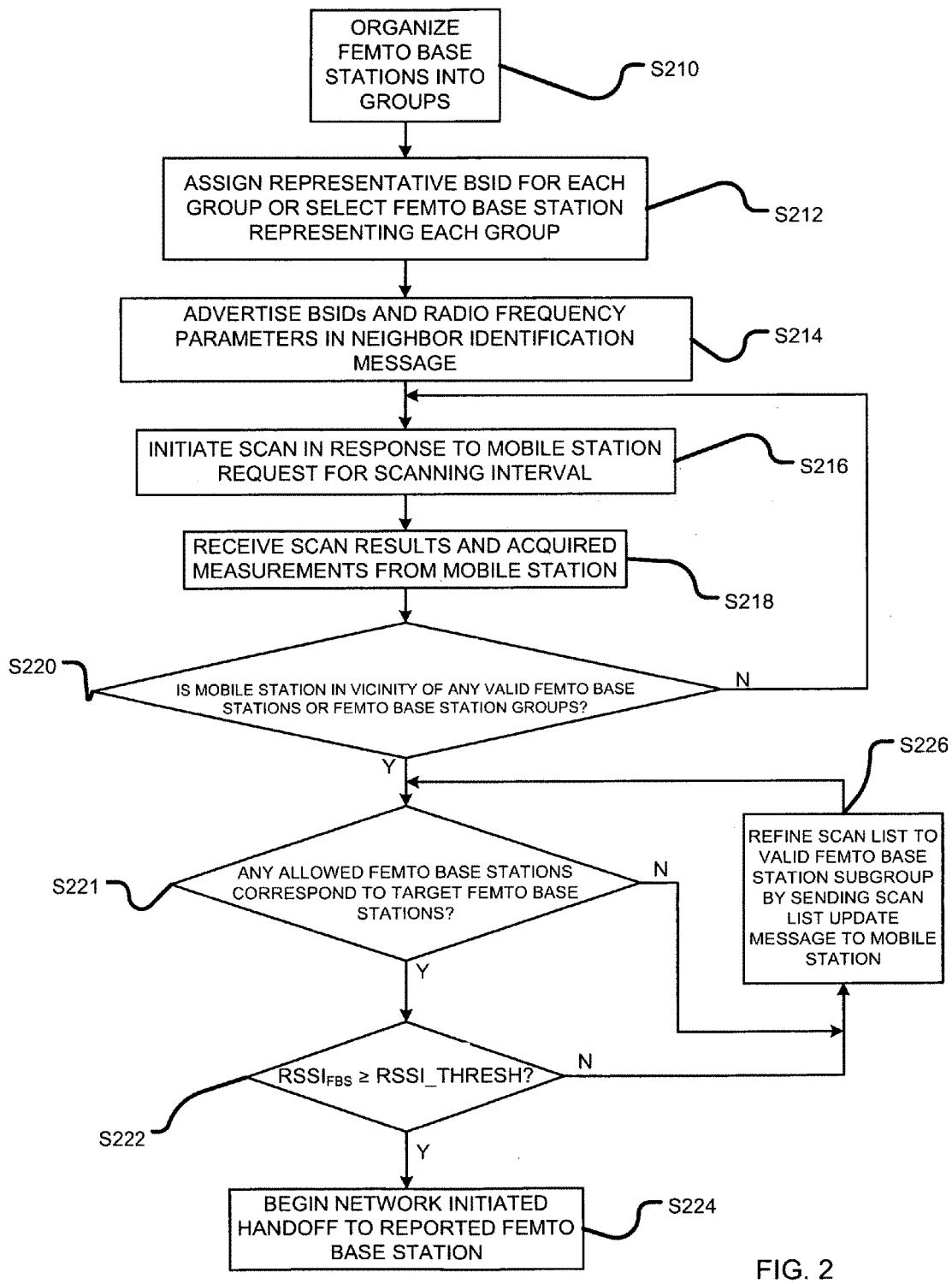
FIG. 2 is a flow chart illustrating a method for managing femto and macro cell deployments according to an example embodiment.

FIG. 2 is a flow chart illustrating a method for managing femto and macro base station co-deployments and/or initiating handoff of a mobile station according to an example embodiment. The example embodiment shown in FIG. 2 will be described assuming that the mobile station 104MS is currently being served by the macro base station 102M. In this example, the method shown in FIG. 2 is performed by the macro base station 102M. However, example embodiments are also applicable to situations in which the mobile station 104MS is served by a femto base station 102F or other base station (e.g., a pico base station, a micro base station, etc.). In this alternative example, the method shown in FIG. 2 is performed by the femto base station 102F. The method shown in FIG. 2 may also be performed at a RAN control node (e.g., an RNC) or base station controller.

Figure 3:
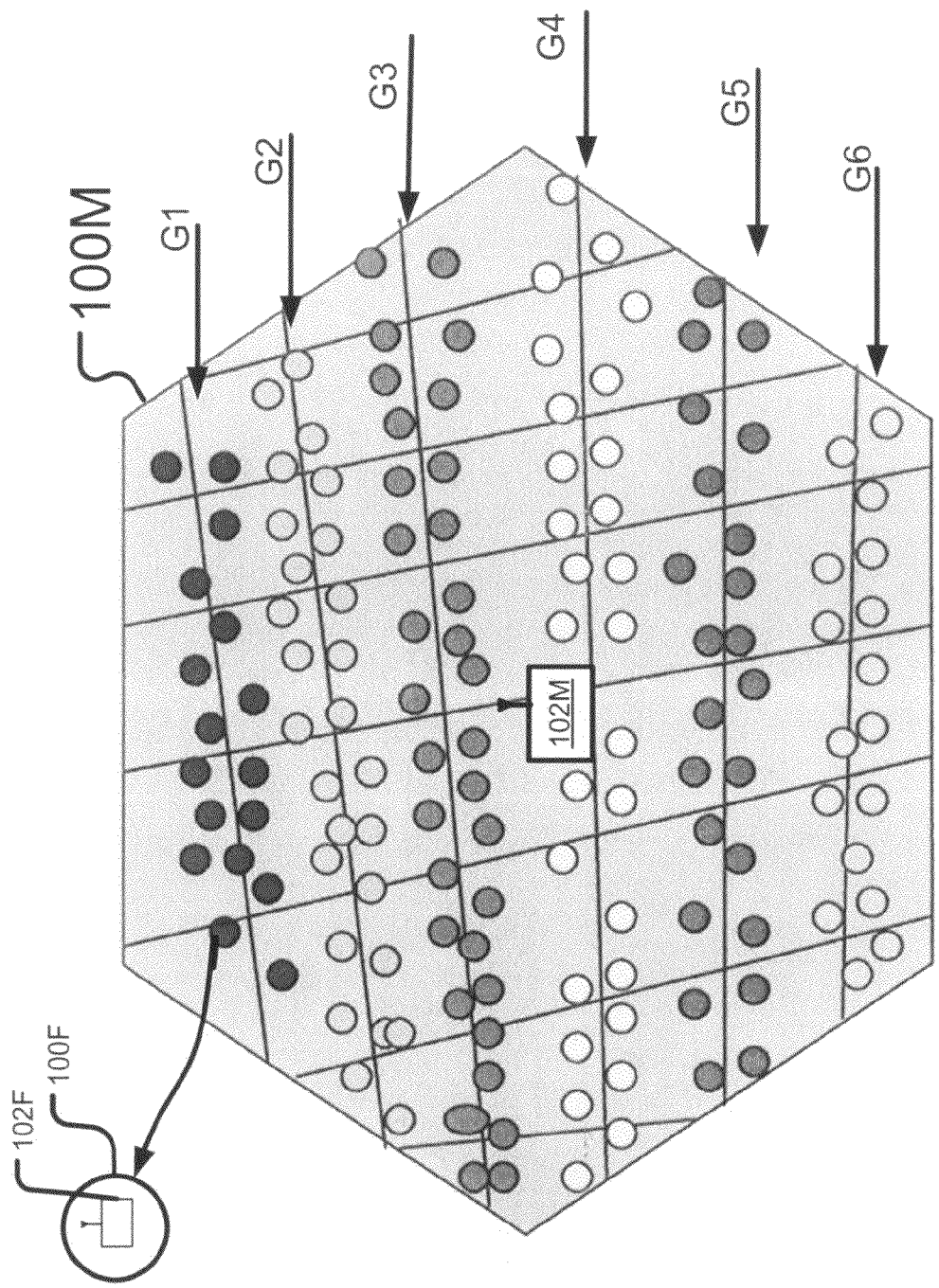
FIGS. 3 and 4 are diagrams for illustrating several steps of the method shown in FIG. 2.

Referring to FIG. 2, at step S210 the macro or pico base station 102M organizes the neighboring femto base stations 102F into certain identifiable groups (referred to as "femto groups") based on femto grouping characteristics. Each of the femto groups includes at least one femto base station. The femto grouping characteristics are associated with each of the femto base stations 102F, and consequently with the femto groups. Femto grouping characteristics may include, for example: radio frequency (RF) characteristics; geographic location characteristics (e.g., neighborhood, street, apartments, etc.); femto paging groups; Frequency Assignment (FA index); unique preamble sequence (an example preamble is described in section 8.4.6.1.1 of "PART 16: AIR INTERFACE FOR BROADBAND WIRELESS ACCESS SYSTEMS" of the 802.16 by IEEE from January 2009, but example embodiments should not be limited to this example) any subset of the unique preamble sequence or unique preamble sequences; Internet Protocol (IP) address subnet; or other logical traits. FIG. 3 illustrates a plurality of femto cells 102F organized into a plurality of femto groups G1 through G6.

In the example shown in FIG. 3, the macro base station 102M groups the plurality of femto base stations 102F into a plurality of femto groups G1 through G6 as described above with regard to step S210 shown in FIG. 2.

Referring back to FIG. 2, at steps S212 through S226, the macro base station 102M manages the organized plurality of neighboring base stations for handoff of the mobile station. Although the managing step is described as including steps S212 through S226 in FIG. 2, according to example embodiments the managing step may encompass one or more of steps S212 through S226 shown and described with regard to FIG. 2.

More specifically, at step S212 the macro base station 102M assigns a representative base station identifier (BSID) to each femto group (e.g., each of femto groups G1 through G6 shown in FIG. 3). The BSID (also referred to as a base station group identifier) is at least one of indicative and representative of, for example, the femto grouping characteristics associated with a given femto group. In one example, the assigned base station group identifier for each group is not a BSID for a base station within the corresponding group.

Alternatively, at step S212, the macro base station 102M selects a femto base station in each femto group as a representative femto base station. In this example, the BSID for the selected femto base station is used as the base station group identifier identifying the respective femto group that may also include a femto base station identified by a different and unique BSID.

Figure 4:
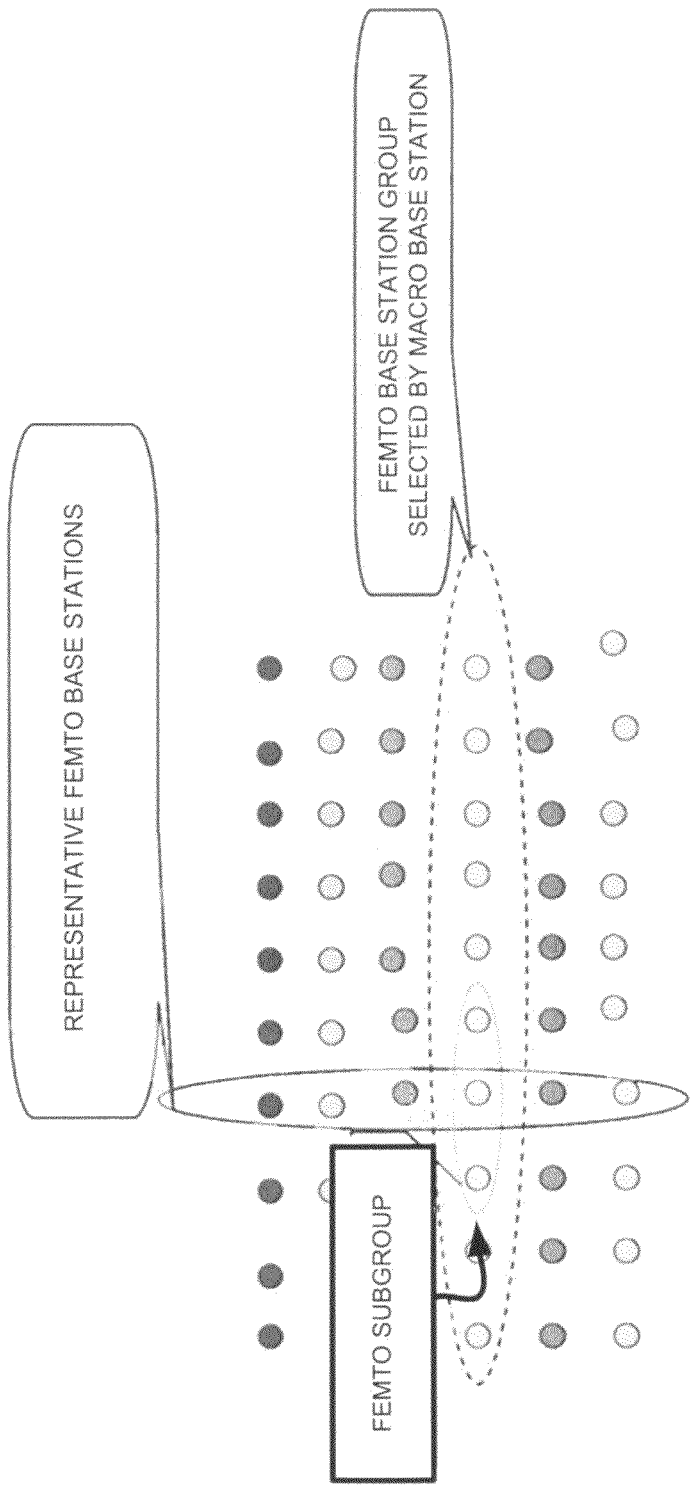

FIG. 4 shows a plurality of femto base stations for illustrating several steps of the method shown in FIG. 2. In one aspect, FIG. 4 shows a case in which the macro base station 102M selects a femto base station from each femto group as a representative femto base station.

Returning to FIG. 2, at step S214 the macro base station 102M advertises its respective neighbors in an advertisement message. In one example, the advertisement message is a neighbor advertisement message such as the NBR-ADV message described in "PART 16: AIR INTERFACE FOR BROADBAND WIRELESS ACCESS SYSTEMS" of the 802.16 by IEEE from January 2009, the AAI_NBR-ADV message described in section 16.2.3.12 of the IEEE P802.16m DRAFT Amendment to IEEE Standard for Local and Metropolitan Area Networks, any broadcast advertisement message or broadcast information. In this example, the macro base station 102M advertises each of the femto groups in an advertisement message including the base station group identifier assigned to each of the groups.

Still referring to FIG. 2, at step S216 the macro base station 102M causes the initiation of a scan of neighboring base stations in response to a request from the mobile station 104MS. The scan is performed over a scanning interval. In this example, the macro base station 102M receives the scan request from the mobile station 104MS in response to the advertisement message. Alternatively, the mobile station 104MS may initiate the scan of neighboring base stations in response to the advertisement message, any broadcast advertisement message or broadcast information.

To initiate the scan, the macro base station 102M generates a list of base stations to be scanned by the mobile station 104MS in response to the scan request from the mobile station 104MS, and sends the generated scan list to the mobile station 104MS.

In one example, if a BSID is used to identify a femto group, the scan list is a temporary list of allowed base stations from the neighboring femto base stations. The scan list may be generated from the advertised list and/or based on previously reported received valid signal strength indicator (RSSI) values for femto base stations, and instructs the mobile station to scan for other base stations from one or more femto groups.

In response to the scan list from the macro base station 102M, the mobile station 104MS scans at least one femto base station belonging to each femto group to identify at least one valid femto group. In this step, the mobile station 104MS also scans the femto base stations in each femto group to determine available neighbor femto base station information, and acquire measurements regarding the femto base stations in each femto group. The acquired measurements may include, for example, base station received signal strength indicator (BS RSSI) values, base station carrier to interference and noise ratio (BS CINR), relative delay, round trip delay (RTD), expected packet error rate (PER), etc. The mobile station 104MS then reports the valid femto groups, acquired information and measurements to the serving macro base station 102M.

In one example, the mobile station 104MS continues to scan at least one femto base station in each group of allowed femto base stations until a valid femto group is detected. As discussed herein, a "valid femto group" for a mobile station includes at least one femto base station, where the mobile station is a subscriber and the mobile station is allowed entry and service. A typical example of this is a mobile station subscriber of a household and the femto base station of the house or a neighborhood of apartments. Non-subscribers of the valid femto group may be denied entry and service, while a subscriber mobile station will be recognized (e.g., based on the mobile station identifier (MSID) and subscriber list) and provided service. Such femto groups are referred to as Closed Subscriber Groups (CSG). But, under a macro base station, there may be base stations, which do not belong to any particular groups. These open groups are 'open' for all subscribers. Hence, a valid base station may be any base station from a CSG, the mobile station subscribership or any open femto base station.

Still referring to FIG. 2, at step S218 the macro base station 102M receives the scan results, acquired measurements and determined valid femto group(s) from the mobile station 104MS.

At step S220, the serving macro base station 102M determines whether the mobile station 104MS is in the vicinity of any valid femto group based on the scan results reported by the mobile station 104MS. In this example, a reported non-zero RSSI value for a particular valid femto group indicates that the mobile station 104MS is in the vicinity of the valid femto group. As discussed herein, a valid femto base station in the vicinity of the mobile station 104MS is referred to as a potential "target femto base station," and a valid femto group in the vicinity of the mobile station 104MS is referred to as a potential "target femto group."

According to example embodiments, the macro base station 102M may identify valid femto groups or valid femto base stations as target femto groups or target femto base stations based on the subscribership of the mobile station 104MS and the proximity of the mobile station 104MS (e.g., indicated by the RSSI value of a member base station in the scan report message) to the femto group. If a BSID is used to represent a femto group in the above-described advertisement message, the mobile station 104MS may report information about multiple members of the femto group indicating that the mobile station 104MS is approaching a target femto base station or target femto group for potential handoff.

Still referring to FIG. 2, if the macro base station 102M determines that the mobile station 104MS is not in the vicinity or proximity of any valid femto group, the process returns to step S216 and continues as discussed herein. In this example, the mobile station 102MS iteratively scans the organized plurality of neighboring base stations if the macro base station 102M determines that the mobile station 104MS is not in the vicinity or proximity of any valid femto group.

Returning to step S220, if the macro base station 102M identifies at least one target femto group, at step S221 the macro base station 102M determines whether any allowed femto base stations correspond to target femto base stations in the one or more target femto groups identified at step S221. As discussed herein, those femto base stations considered as both allowed and target femto base stations are referred to as "candidate femto base stations." In one example, the macro base station 102M compares BSIDs of the allowed femto base stations with BSIDs of the target femto base stations to determine the candidate femto base stations or candidate femto group(s).

If the macro base station 102M identifies one or more candidate femto base stations at step S221, then at step S222 the macro base station 102M compares a received signal strength indicator value $RSSI_{FBS}$ for each of the identified candidate femto base stations with a signal strength indicator threshold value RSSI_THRESH. In one example, the received signal strength indicator values are received signal strength indicators (RSSI) and/or carrier to interference and noise ratio (CINR) reported to the macro base station 102M by the mobile station 104MS. And, the signal strength indicator threshold is an RSSI threshold.

If the received signal strength indicator value $RSSI_{FBS}$ for one or more of the candidate femto base stations passes the signal strength indicator threshold, the macro base station 102M initiates handoff of the mobile station 104MS to one of the candidate femto base stations having a received signal strength indicator value $RSSI_{FBS}$ that passes the signal strength indicator threshold at step S224. The mobile station 104MS is then handed off to the candidate femto base station as is known in the art.

According to example embodiments, a received signal strength indicator value $RSSI_{FBS}$ passes the signal strength indicator threshold if the received signal strength indicator value $RSSI_{FBS}$ is greater than or equal to the signal strength indicator threshold value RSSI_THRESH.

If more than one candidate femto base station has a received signal strength indicator value $RSSI_{FBS}$, which is greater than or equal to the signal strength indicator threshold value RSSI_THRESH, the macro base station 102M selects one of the candidate femto base stations to which to hand off the mobile station 104MS. In one example, the macro base station 102M selects the candidate femto base station associated with the highest received signal strength indicator value $RSSI_{FBS}$. In another example, the macro base station 102M selects the candidate femto base station based on a loading of the candidate femto base stations. In yet another example, the macro base station 102M selects the candidate femto base station based on an expected packet error rate (PER).

Returning to step S222, if none of the candidate femto base stations has a received signal strength indicator value $RSSI_{FBS}$ greater than or equal to the signal strength indicator threshold value RSSI_THRESH, at step S226 the macro base station 102M refines the scan list to the target base stations identified at step S220. In one example, the macro base station 102M refines the scan list of base stations at the mobile station 104MS by sending a scan list update message to the mobile station 104MS. The scan list update message may be a SCAN-RSP message identifying at least a portion of the allowed base stations.

After refining the scan list at step S226, the process returns to step S221 and proceeds as discussed above.

Returning to step S221, if no allowed femto base stations correspond to identified target femto base stations, the method proceeds to step S226 and continues as discussed above.

Example embodiments provide a more manageable target list of base stations in portions of a wireless communication network including macro and femto base stations.

The invention being thus described, it will be obvious that the same may be varied in many ways. Such variations are not to be regarded as a departure from the invention, and all such modifications are intended to be included within the scope of the invention.

We claim:

1. A method for managing a plurality of neighboring base stations and handoff of a mobile station, the method comprising:
   organizing, by a radio frequency equipment, the plurality of neighboring base stations into groups according to base station grouping characteristics associated with the plurality of neighboring base stations;
   transmitting, by the radio frequency equipment, an advertisement message including a plurality of base station group identifiers such that each base station, upon receiving the advertisement message, is notified of a group to which the base station belongs as well as remaining ones of the plurality of base station group identifiers for other groups of base stations, each of the plurality of base station group identifiers identifying one of the groups; and
   managing the handoff of the mobile station to a base station in an advertised group.

2. The method of claim 1, wherein the base station grouping characteristics include at least one of radio frequency characteristics associated with the plurality of neighboring base stations, geographic location characteristics associated with the plurality of neighboring base stations, base station paging groups, Frequency Assignment, and Internet Protocol address subnet for the mobile station.

3. The method of claim 2, wherein the radio frequency characteristics include at least one of frequency assignment, unique preamble sequence, and cyclic prefix.

4. The method of claim 1, further comprising:
   assigning, by the radio frequency equipment, one of the plurality of base station group identifiers to each group of base stations based on the associated base station grouping characteristics;
   wherein the transmitting step includes,
      advertising, by the radio frequency equipment, each of the groups in the advertisement message.

5. The method of claim 1, wherein the advertisement message is an NBR-ADV or an AAI_NBR-ADV message.

6. The method of claim 1, further comprising:
   selecting a base station in each group as a representative base station;
   wherein the transmitting step includes,
      advertising, by the radio frequency equipment, each of the groups in the advertisement message,
      the base station group identifier for each group is a base station identifier for the selected base station, and
      the base station identifier is at least one of indicative and representative of base station grouping characteristics.

7. The method of claim 6, wherein the advertisement message is an NBR-ADV or an AAI_NBR-ADV message.

8. A method for managing a plurality of neighboring base stations and initiating handoff of a mobile station, the method comprising:
   organizing, by a radio frequency equipment, the plurality of neighboring base stations into groups according to base station grouping characteristics associated with each of plurality of neighboring base stations;
   advertising, by the radio frequency equipment, each of the groups in an advertisement message, the advertisement message including a plurality of a base station group identifiers such that each base station, upon receiving the advertisement message, is notified of a group to which the base station belongs as well as remaining ones of the plurality of base station group identifiers for other groups of base stations, each of the plurality of base station group identifiers identifying one of the groups based on the base station grouping characteristics associated with a corresponding group; and
   at least one of managing and initiating, by the radio frequency equipment, handoff of the mobile station to a base station in an advertised group.

9. The method of claim 8, wherein the base station group identifier for each group is not a base station identifier for a base station in the corresponding group.

10. The method of claim 8, further comprising:
selecting a base station in each group as a representative base station; wherein
the base station group identifier for each group is a base station identifier for the selected base station.

11. The method of claim 8, wherein the advertisement message is an NBR-ADV or an AAI_NBR-ADV message.

12. The method of claim 8, wherein the at least one of managing and initiating steps comprises:
determining, by a radio frequency equipment, whether the mobile station is in a vicinity of at least one of the organized plurality of neighboring base stations;
comparing, by the radio frequency equipment, a received signal strength indicator with a signal strength indicator threshold, the received signal strength indicator being associated with the at least one neighboring base station; and
initiating, by the radio frequency equipment, handoff of the mobile station to the at least one neighboring base station if the received signal strength indicator passes the signal strength indicator threshold.

13. The method of claim 12, wherein the at least one of managing and initiating steps comprises:
generating, by the radio frequency equipment, a list of base stations in response to a scan request message from the mobile station, the scan list including a temporary list of allowed base stations among the organized plurality of neighboring base stations, the allowed list of base stations being generated based on reported signal strength indicator values associated with the organized plurality of neighboring base stations;
initiating, by the radio frequency equipment, a scan of the organized plurality of neighboring base stations in response to a request for a scanning interval from the mobile station; and wherein
the determining step determines whether the mobile station is in the vicinity of at least one of the organized plurality of neighboring base stations based on scan results and measurements acquired during the scan.

14. The method of claim 12, wherein the at least one of managing and initiating steps comprises:
initiating, by the mobile station a scan of the organized plurality of neighboring base stations in response to the advertisement message; and wherein
the determining step determines whether the mobile station is in the vicinity of at least one of the organized plurality of neighboring base stations based on scan results and measurements acquired during the scan.

15. The method of claim 12, further comprising:
iteratively scanning, by the mobile station, the organized plurality of neighboring base stations if the determining step determines that the mobile station is not in the vicinity of at least one of the organized plurality of neighboring base stations.

16. The method of claim 12, further comprising:
determining whether the at least one neighboring base station corresponds to an identified valid base station if the radio frequency equipment determines that the mobile station is in the vicinity of a valid base station group; and wherein
the comparing step compares the received signal strength indicator associated with the at least one neighboring base station with a signal strength indicator threshold if the at least one neighboring base station corresponds to the identified valid base station; wherein
the valid base station group is a group of base stations of which the mobile station is a subscriber and the mobile station expects entry and service.

17. The method of claim 12, wherein if a plurality of neighboring base stations have received signal strength indicators passing the signal strength indicator threshold, the method further comprises:
selecting, by the radio frequency equipment, the base station having a highest received signal strength indicator as the base station to which the mobile station is to be handed off; and wherein
the initiating step initiates handoff of the mobile station to the selected base station.

18. The method of claim 12, wherein if a plurality of neighboring base stations have received signal strength indicators passing the signal strength indicator threshold, the method further comprises:
selecting, by the radio frequency equipment, the valid target base station based on a loading of the base stations; and wherein
the initiating step initiates handoff of the mobile station to the selected valid base station.

19. The method of claim 12, wherein if a plurality of neighboring base stations have received signal strength indicators passing the signal strength indicator threshold, the method further comprises:
selecting, by the radio frequency equipment, the valid target base station based on an expected packet error rate; and wherein
the initiating step initiates handoff of the mobile station to the selected valid base station.

20. A method for managing a plurality of neighboring base stations and initiating handoff of a mobile station to one of the plurality of neighboring base stations, the method comprising:
organizing, by a radio frequency equipment, the plurality of neighboring base stations into groups according to base station grouping characteristics associated with each of plurality of neighboring base stations;
advertising, by the radio frequency equipment, each of the groups in an advertisement message, the advertisement message including a plurality of base station group identifiers such that each base station, upon receiving the advertisement message, is notified of a group to which the base station belongs as well as remaining ones of the plurality of base station group identifiers for other groups of base stations, each of the plurality of base station group identifiers identifying one of the groups based on the base station grouping characteristics associated with a corresponding group; and
at least one of managing and initiating, by the radio frequency equipment, handoff of the mobile station to a base station in an advertised group; wherein
the base station group identifier associated with each of the groups is a base station identifier for a representative base station within each group.

21. The method of claim 20, wherein the at least one of managing and initiating steps comprises:
determining, by a radio frequency equipment, whether the mobile station is in a vicinity of at least one of the plurality of neighboring base stations;
comparing, by the radio frequency equipment, a received signal strength indicator with a signal strength indicator threshold, the received signal strength indicator being associated with the at least one neighboring base station; and initiating, by the radio frequency equipment, handoff of the mobile station to the at least one neighboring base station if the received signal strength indicator passes the signal strength indicator threshold.

22. The method of claim 21, further comprising:

determining whether the at least one neighboring base station corresponds to an identified valid base station if the radio frequency equipment determines that the mobile station is in the vicinity of a valid base station group; and wherein the comparing step compares the received signal strength indicator associated with the at least one neighboring base station with the signal strength indicator threshold if the at least one neighboring base station corresponds to the identified valid base station; wherein the valid base station group is a group of base stations of which the mobile station is a subscriber and the mobile station expects entry and service.

23. The method of claim 21, wherein if a plurality of neighboring base stations have received signal strength indicators passing the signal strength indicator threshold, the method further comprises:

selecting, by the radio frequency equipment, the base station having a highest received signal strength indicator as the base station to which the mobile station is to be handed off; and wherein the initiating step initiates handoff of the mobile station to the selected base station.

24. The method of claim 21, wherein if a plurality of neighboring base stations have received signal strength indicators passing the signal strength indicator threshold, the method further comprises:

selecting, by the radio frequency equipment, the valid target base station based on a loading of the base stations; and wherein the initiating step initiates handoff of the mobile station to the selected valid base station.

25. The method of claim 21, wherein if a plurality of neighboring base stations have received signal strength indicators passing the signal strength indicator threshold, the method further comprises:

selecting, by the radio frequency equipment, the valid target base station based on an expected packet error rate; and wherein the initiating step initiates handoff of the mobile station to the selected valid base station.

* * * * *